(12) United States Patent
Gall et al.

(10) Patent No.: US 12,253,154 B1
(45) Date of Patent: Mar. 18, 2025

(54) DIFFERENTIAL WITH AUXILIARY GEAR

(71) Applicant: GKN Automotive Limited, Birmingham (GB)

(72) Inventors: David E. Gall, Clarkston, MI (US); Kevin J. Kaplan, Macomb, MI (US); Mark A. Heinze, Tecumseh (CA); Rick Ohsiek, Sterling Heights, MI (US)

(73) Assignee: GKN Automotive Limited, Birmingham (GB)

(*) Notice: Subject to any disclaimer, the term of this patent is extended or adjusted under 35 U.S.C. 154(b) by 0 days.

(21) Appl. No.: 18/391,067

(22) Filed: Dec. 20, 2023

(51) Int. Cl.
*F16H 48/40* (2012.01)
*F16H 48/08* (2006.01)
*F16H 57/04* (2010.01)

(52) U.S. Cl.
CPC ............. *F16H 48/40* (2013.01); *F16H 48/08* (2013.01); *F16H 57/0483* (2013.01)

(58) Field of Classification Search
CPC ............... F16H 48/40; F16H 48/08; F16H 2057/02052; F16H 57/023; F16H 2057/0235; F16H 57/0483
USPC ................................ 475/230, 160; 74/606 R
See application file for complete search history.

(56) References Cited

U.S. PATENT DOCUMENTS

| | | | |
|---|---|---|---|
| 6,827,662 B2 * | 12/2004 | Nishiji | B60K 17/16 475/221 |
| 7,819,040 B2 * | 10/2010 | Meier | F16H 48/08 74/607 |
| 9,388,893 B1 | 7/2016 | Eckart et al. | |
| 10,473,203 B2 | 11/2019 | Komatsu | |
| 10,704,664 B2 | 7/2020 | Ogawa | |
| 2005/0137047 A1 * | 6/2005 | Hay | F16H 57/023 74/606 R |

FOREIGN PATENT DOCUMENTS

WO WO-2020193027 A1 * 10/2020 ............. F16H 48/40

OTHER PUBLICATIONS

JP200832120A with english translation; Jun. 20, 2024 (Year: 2024).*
English translation of WO20201930271A1; http://translationportal.epo.org; Jun. 20, 2024 (Year: 2024).*

* cited by examiner

*Primary Examiner* — Roger L Pang
(74) *Attorney, Agent, or Firm* — Reising Ethington P.C.

(57) ABSTRACT

A vehicle differential includes a housing, an input gear mounted to the housing so that the housing and input gear rotate together, a pinion shaft mounted in the housing, first and second pinion gears mounted on the pinion shaft, first and second side gears within the housing and engaged with the pinion gears, and a second gear mounted to the housing so that the second gear and the housing rotate together. Part of the second gear overlaps at least part of the pinion shaft and limits movement of the pinion shaft relative to the housing.

19 Claims, 4 Drawing Sheets

DIFFERENTIAL WITH AUXILIARY GEAR

TECHNICAL FIELD

The present disclosure relates generally to a differential with an auxiliary gear.

BACKGROUND

During normal operation of a motor vehicle, it is common that all four wheels are not turning at an identical rate of speed. Different wheel turn rates are most commonly encountered when the vehicle is making a turn, but may also be caused by braking or non-uniform road surface conditions. Differential are used to accommodate differing wheel turning rates and have various gears including pinion gears mounted on a pinion shaft. The pinion shaft is coupled to a housing of the differential by clips or fasteners installed during assembly of the differential.

SUMMARY

In at least some implementations, a vehicle differential includes a housing, an input gear mounted to the housing so that the housing and input gear rotate together, a pinion shaft mounted in the housing, first and second pinion gears mounted on the pinion shaft, first and second side gears within the housing and engaged with the pinion gears, and a second gear mounted to the housing so that the second gear and the housing rotate together. Part of the second gear overlaps at least part of the pinion shaft and limits movement of the pinion shaft relative to the housing.

In at least some implementations, the housing includes at least one pinion shaft opening through which the pinion shaft is received into the housing, and wherein the second gear overlaps at least part of the at least one pinion shaft opening. In at least some implementations, the housing includes two pinion shaft openings and each end of the pinion shaft is received in a respective one of the pinion shaft openings and the second gear overlaps at least part of each end of the pinion shaft.

In at least some implementations, the housing includes a gear mounting surface and the second gear includes an inner surface received over at least part of the gear mounting surface. In at least some implementations, the second gear has an axis of rotation and the inner surface axially overlaps the pinion shaft by at least 0.5 mm. In at least some implementations, the inner surface overlaps the pinion shaft by at least 10% of the diameter of the pinion shaft. In at least some implementations, the housing includes two pinion shaft openings and each end of the pinion shaft is received in a respective one of the pinion shaft openings, and wherein the gear mounting surface has a center axis and the gear mounting surface has a lesser axial extent in the area of pinion shaft openings than in at least some areas circumferentially spaced from the pinion shaft openings. In at least some implementations, the inner surface has a diameter that is larger by 3 mm or less than an axial length of the pinion shaft.

In at least some implementations, the gear mounting surface extends circumferentially about an exterior of the housing and the gear mounting surface extends parallel to a rotational axis of the input gear.

In at least some implementations, the input gear and the second gear are coaxial.

In at least some implementations, the second gear has a rotational axis and includes radially outwardly extending teeth, and wherein at least part of the teeth axially overlap the pinion shaft.

In at least some implementations, the second gear has a rotational axis and outwardly extending teeth, and wherein the teeth are axially centered on the second gear. In at least some implementations, the second gear is symmetrical about the axis of the second gear.

In at least some implementations, the pinion shaft is retained relative to the housing by the second gear without another retaining component connected to either the housing or the pinion shaft.

In at least some implementations, the input gear and the second gear are coaxial and the second gear is axially offset from the input gear.

In at least some implementations, the housing includes at least one window open to an interior of the housing and through which one or more gears are installed into the interior, and wherein the second gear overlaps part of the at least one window.

BRIEF DESCRIPTION OF THE DRAWINGS

The following detailed description of preferred embodiments and best mode will be set forth with reference to the accompanying drawings, in which.

DETAILED DESCRIPTION

Figure 1:
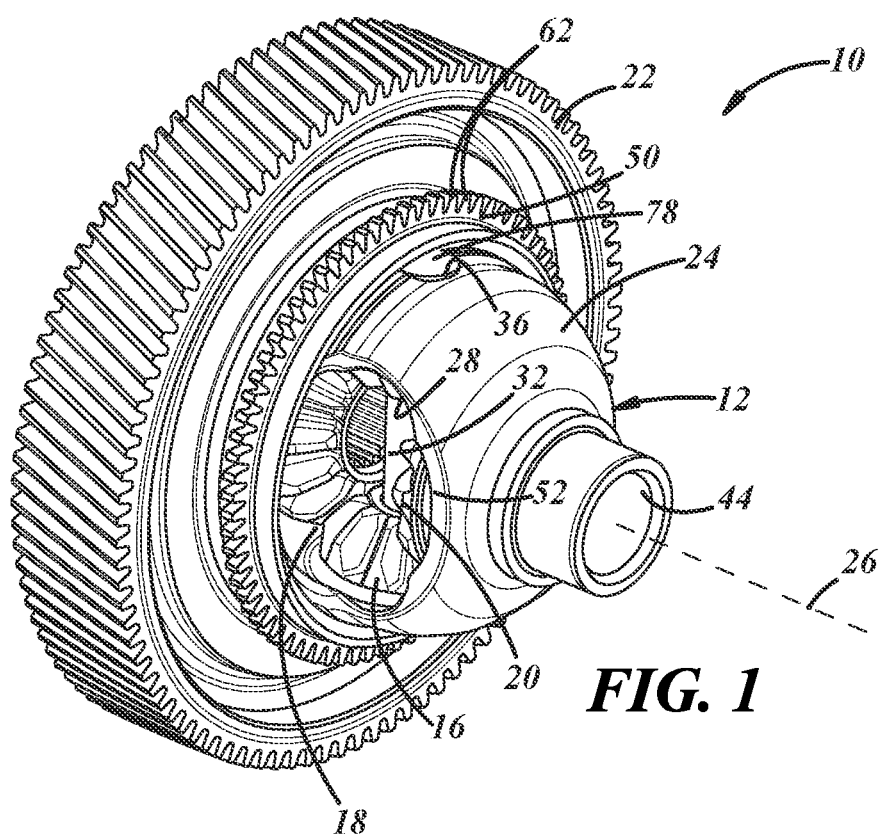
FIG. 1 is a perspective view of a differential including an input gear and an auxiliary or second gear.

Referring in more detail to the drawings, an automotive differential 10 can be equipped in an automotive driveline between, for example, sideshafts of a front axle, between sideshafts of a rear axle, or between front and rear axles. In general, the differential 10 can have different designs and constructions depending upon, among other possible influences, the architecture of the larger AWD automotive driveline, upstream and downstream driveline components, packaging requirements, and torque output demands. In the embodiments presented in the figures, the differential 10 includes a housing 12, a first pinion gear 14, a second pinion gear 16, a first side gear 18, and a second side gear 20; still, more, less, and/or different components can be included in other embodiments. For instance, the differential 10 could have more than two pinion gears, and could have three or four or more pinion gears. An input gear 22, shown as a hypoid ring gear, is fixed to the housing exterior 24 so that it is engaged in use by an upstream output gear, such as an output gear of a transmission in a front axle layout or that of a propeller shaft of the automotive driveline. When driven, the housing 12 rotates about an axis 26. In an interior 28, the housing 12 defines a cavity suited to receive the pinion gears 14, 16 and the side gears 18, 20 therein.

Figure 2:
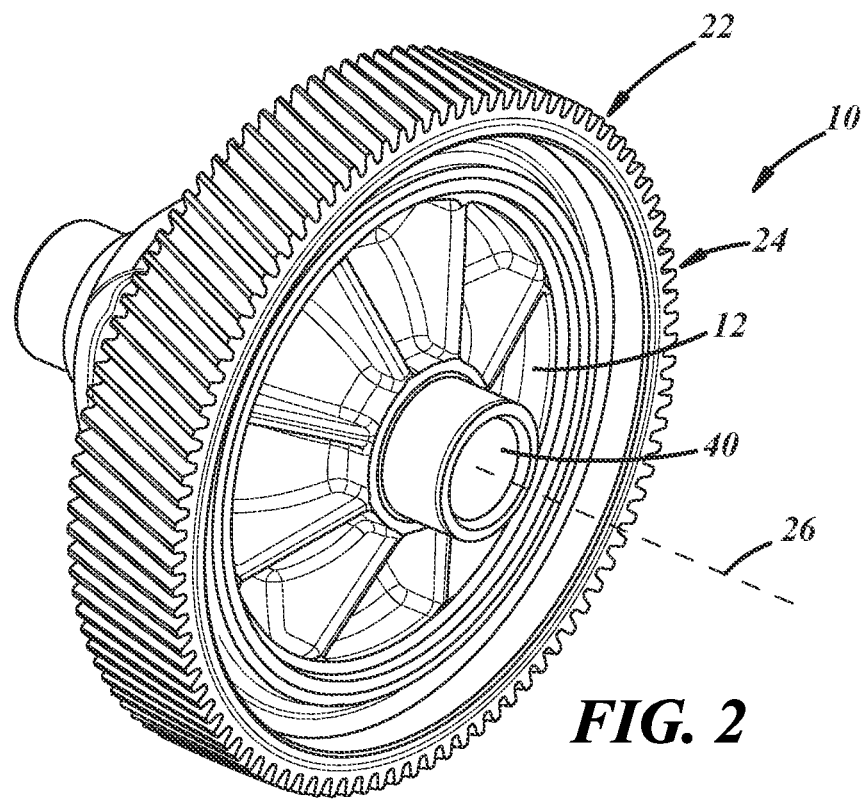
FIG. 2 is another perspective view of the differential of FIG. 1.
Figure 3:
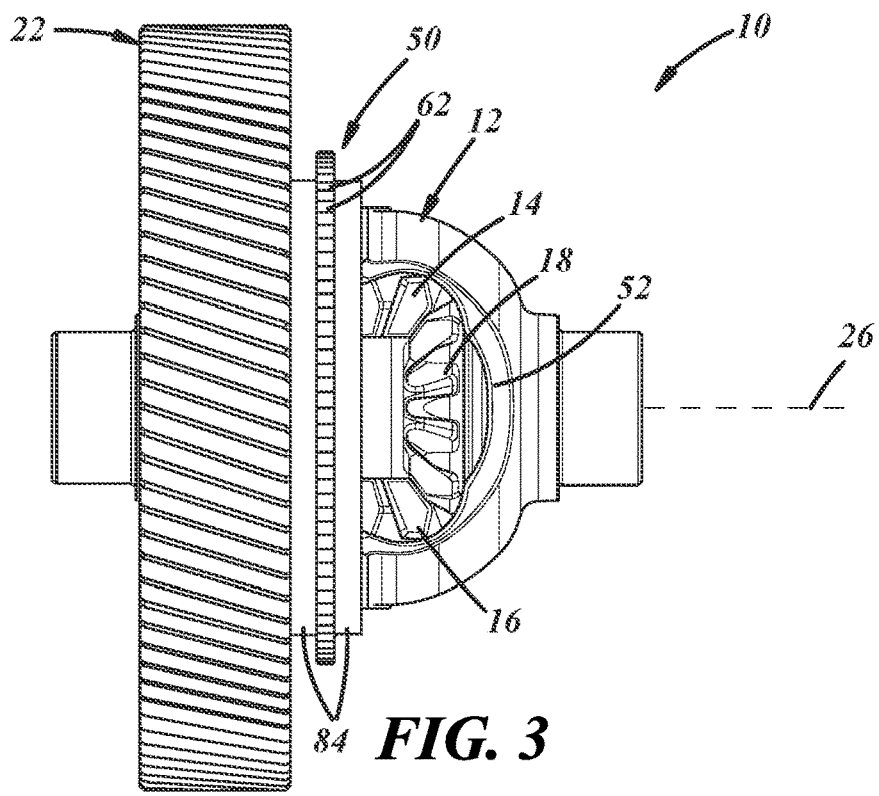
FIG. 3 is a side view of the differential.
Figure 4:
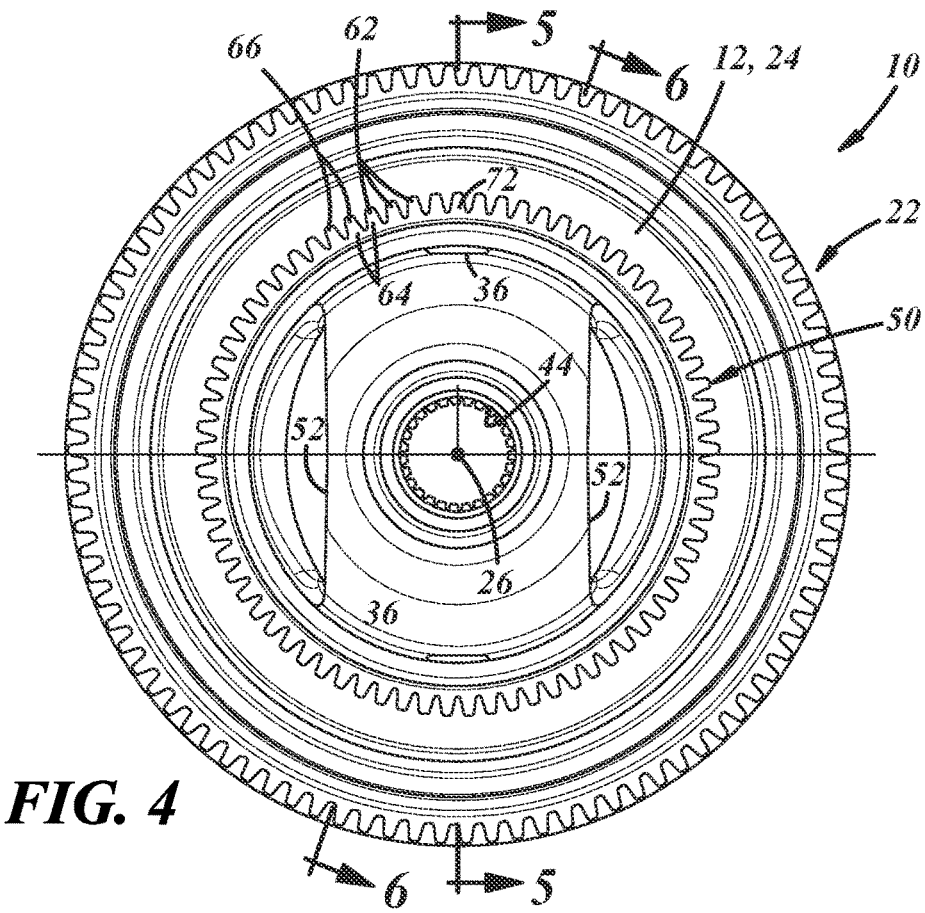
FIG. 4 is an end view of the differential.
Figure 5:
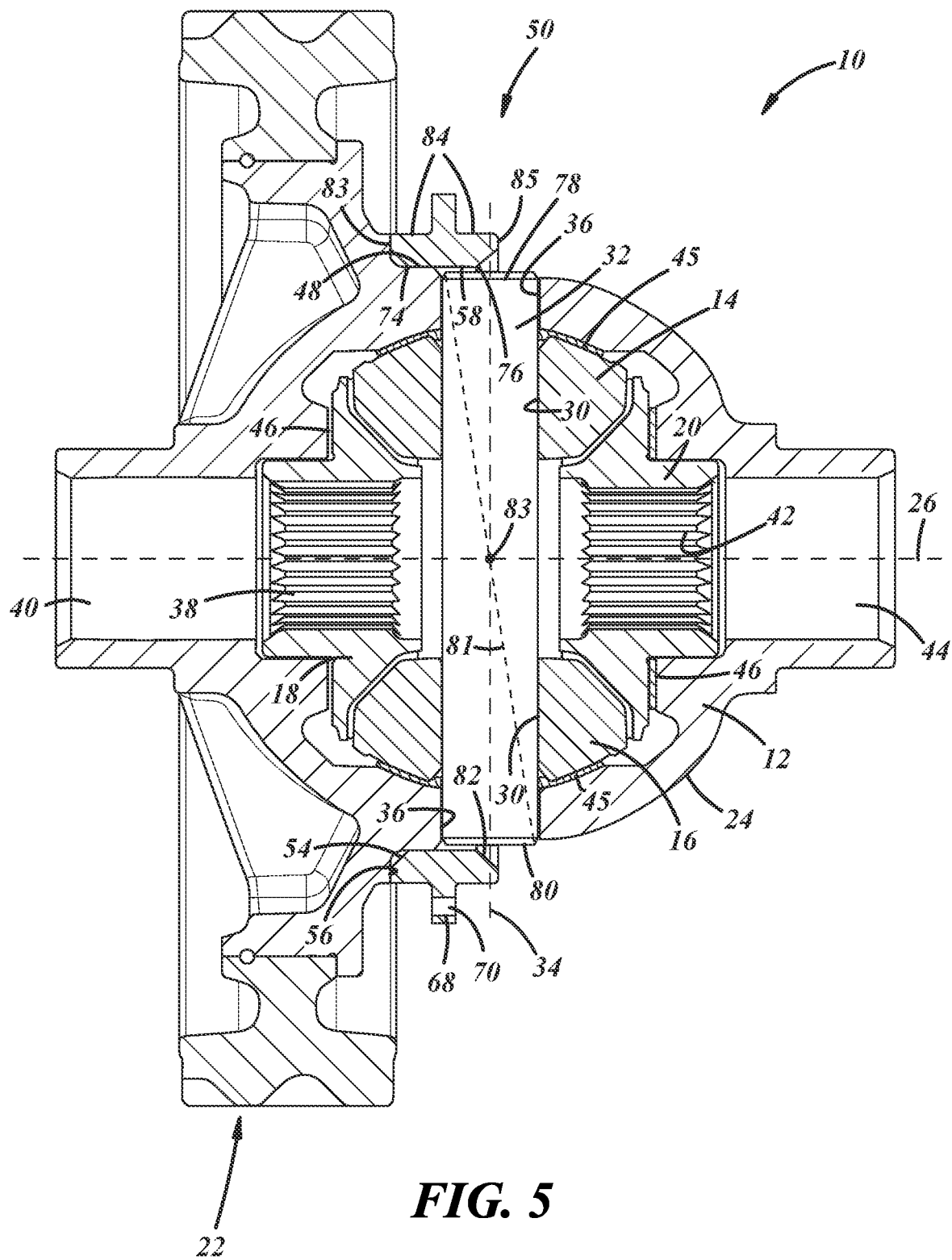
FIG. 5 is a sectional view taken generally along line 5-5 of FIG. 4.

The first and second pinion gears 14, 16 and first and second side gears 18, 20 interact with one another to carry out the automotive differential's functionalities. Each of the gears 14, 16, 18, 20 has teeth formed around its exterior. In this embodiment, in assembly and use of the automotive differential 10, the teeth of the first pinion gear 14 mesh with the teeth of the first and second side gears 18, 20, and similarly the teeth of the second pinion gear 16 mesh with the teeth of the first and second side gears 18, 20. As shown in FIG. 5, the first and second pinion gears 14, 16 include passages that define an inner surface 30 of the pinion gears 14, 16 through which a pinion shaft 32 extends. The pinion shaft 32 has a center axis 34 and is mounted in pinion shaft openings 36 in opposite sides of the differential housing 12. The first side gear 18 has a set of internal splines 38 for connection to a first sideshaft an end of which is received in an opening 40 of the housing 12, and the second side gear 20 has a set of internal splines 42 for connection to a second sideshaft an end of which is received in a generally oppositely facing opening 44 in the housing 12. As shown in FIGS. 1 and 2, pinion gear washers 45 may be situated between the housing 12 and the first and second pinion gears 14, 16, and side gear washers 46 may be located between the housing 12 and the first and second side gears 18, 20.

Figure 6:
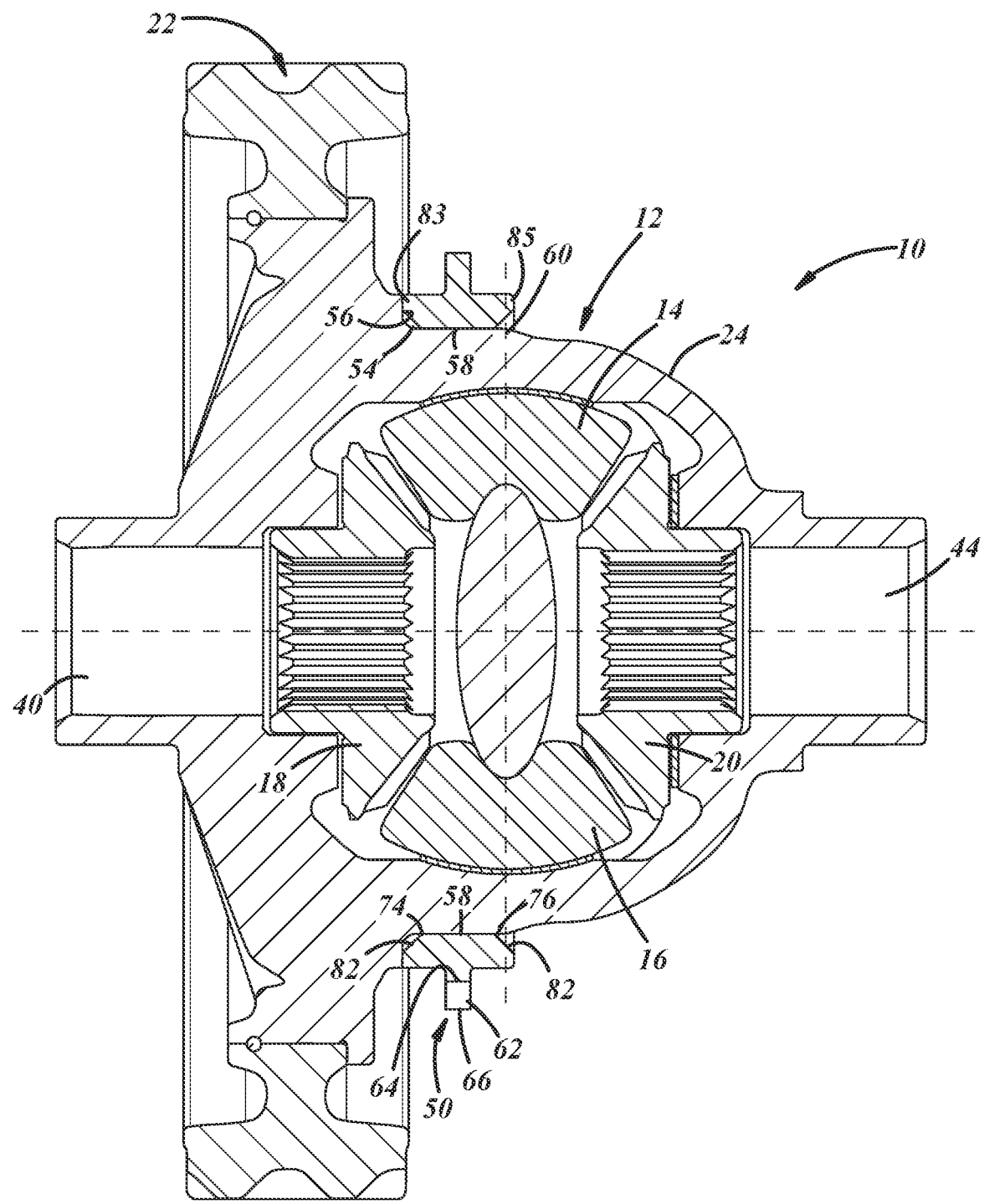
FIG. 6 is a sectional view taken generally along line 6-6 of FIG. 4.

The differential housing 12 may include a gear mounting surface 48 for an auxiliary or second gear 50 of the differential 10. In at least some implementations, the gear mounting surface 48 extends circumferentially and axially, and may be a cylindrical surface arranged parallel to the axis 26 and axially offset from and coaxial with the input gear 22. As shown, for example by comparison of FIGS. 5 and 6, the axial extent or length of the gear mounting surface 48 may vary along its circumferential length, due, for example, to openings or windows 52 via which the gears 14-20 may be inserted into the housing 12 and pinion shaft openings 36 that extend through the exterior of the differential housing 12. The gear mounting surface 48 includes a first axial end 54 that, in at least some implementations, may be circumferentially continuous and located axially spaced from the pinion shaft openings 36. A radially extending stop surface 56 may be located at or adjacent to the first axial end 54 of the gear mounting surface 48 and may be arranged to engage the second gear 50 when fully installed, as noted in more detail below. As shown in FIG. 6, in at least some implementations, part of the gear mounting surface 48 extends axially a distance sufficient to fully underlie or support a radial inner surface 58 of the second gear 50. That is, the distance between the first axial end 54 and a second axial end 60 of the gear mounting surface 48 may be equal to or greater than the axial extent of the inner surface 58 of the second gear 50, if desired. As noted, the second axial end 60 of the gear mounting surface 48 may be circumferentially discontinuous, and interrupted by the pinion shaft openings 36 and one or more windows 52 of the differential housing 12. While shown as being parallel to the axis 26, the gear mounting surface 48 may be oriented as desired to receive at least part of the second gear 50 and to facilitate connection of the second gear 50 to the differential housing 12.

As shown in FIGS. 1 and 3-6, the auxiliary or second gear 50 is carried by the differential 10 and may be fixed to the differential housing 12 for rotation with the differential housing 12 without relative rotation between them. In at least some implementations, the second gear 50 is concentric with the input gear 22 about axis 26, and the radial inner surface 58 of the second gear 50 axially overlaps at least part of the gear mounting surface 48 of the different housing 12. In at least some implementations, the second gear 50 is coupled to the differential housing 12 by a friction or interference fit between the inner surface 58 and gear mounting surface 48, although the second gear 50 may be fixed to the housing 12 in other ways, such as but not limited to, welding, fasteners (clips, bolts or other), adhesive, heat staking or the like. In this way, the second gear 50 rotates with the differential housing 12.

In the example shown, the second gear 50 is a spur type gear with circumferentially spaced apart teeth 62 extending radially or generally radially outwardly from a base 64 to a free end or tip 66 located radially outwardly of the base 64, and a tooth line 68 (FIG. 5) parallel to the axis 26. Faces 70 of each tooth 62 extend radially and axially and are circumferentially spaced from the faces of adjacent teeth 62. The free end 66 may define the radially outermost part of the second gear 50, with gaps between adjacent teeth 62 being open to the radial exterior of the second gear 50. Of course, other gear types may be used, such as a helical or bevel gear, by way of a couple non-limiting examples.

As best shown in FIGS. 5 and 6, the inner surface 58 of the second gear 50 may extend to a first side 74 and to a second side 76 that is axially spaced from the first side 74. The inner surface 58 may be cylindrical and may be a right circular cylinder at a constant radius from the axis 26. At least part of the inner surface 58 that includes the first side 74, axially overlaps the gear mounting surface 48 and may be connected thereto. Further, at least part of the inner surface 58 radially overlaps the pinion shaft openings 36 and the pinion shaft 32, and may overlap part of one or more of the windows 52. In at least some implementations, part of the inner surface 58 of the second gear 50 is located radially outwardly of and axially overlaps both ends 78, 80 (FIG. 5) of the pinion shaft 32. The pinion shaft 32 may thus be retained in the differential housing 12 by the overlapping second gear 50.

In at least some implementations, the inner surface 58 axially overlaps the pinion shaft 32 by at least 0.5 mm, may axially overlap the entire pinion shaft 32, and in at least some implementations the inner surface 58 overlaps the pinion shaft 32 by at least 10% of the diameter of the pinion shaft 32 which may include a chamfer at its ends. In at least some implementations, the inner surface 58 of the second gear 50 has a diameter that is not more than 3 mm greater than the axial length of the pinion shaft 32 between its ends 78, 80, permitting limited movement of the pinion shaft 32 along its axis 34 and relative to the differential housing 12 and second gear 50. In at least some implementations the difference between the inner surface diameter and a cross length 81 (FIG. 5) of the pinion shaft 32, which is defined by a straight line that extends through a center 83 of the pinion shaft 32 to diametrically opposed locations at opposite ends 78, 80 of the shaft, is 0.5 mm or less, and in at least some implementations this difference is 0.3 mm or less, with some implementations including a friction fit between the inner surface 58 and the pinion shaft ends 78, 80.

In at least some implementations, no other coupler or connector between the pinion shaft 32 and differential housing 12 is needed. For example, some pinion shafts are retained in a differential housing 12 by a pin that extends radially into an opening in the pinion shaft, and/or c-shaped or similarly shaped clips are received in grooves formed in one or both of the pinion shaft and housing 12, and/or an end of the pinion shaft is pressed or otherwise friction fit in a pinion shaft opening of the differential housing 12. In this way, the pinion shaft 32 may be a simple shaft, such as a right, circular cylindrical shaft, without any openings or grooves to receive components (e.g. pins/clips/fasteners) to retain the position of the pinon shaft, and thus, the pinion shaft 32 can be made in less time and at less cost. While none of these modes or manners of connection are needed, one or more of them may be used in conjunction with the second gear 50 as the primary retainer of the pinion shaft 32, if desired. For example, to facilitate retention of the pinion shaft location in the housing 12 prior to the second gear 50 being assembled to the differential housing 12, an end 78 or 80 of the pinion shaft 32 may be friction fit in a pinion shaft opening 36, if desired, even if the friction fit is minimal and only effective during assembly of the differential 10 and does not always prevent movement of the pinion shaft 32 when the differential 10 is in use.

As shown in FIGS. 5 and 6, beveled or inclined transition surfaces 82 may extend axially and radially outwardly from one or both of the inner surface 58 such that the second gear 50 has a greater inner diameter at the first and second axial ends 83, 85 of the gear 50 than at the inner surface 58. This may facilitate fitting the second gear 50 onto and aligning the gear with the mounting surface 48. Further, the interior of the second gear 50 (e.g. including the inner surface 58 and any transition or other surfaces) may be axially symmetrical so that the gear 50 may be connected in either orientation relative to the differential housing 12. Likewise, the exterior of the second gear 50 may be axially symmetrical so that the gear teeth 62 are in the same axial location in either orientation of the second gear 50 when mounted to the differential housing 12. In the example shown, the gear teeth 62 of the second gear 50 extend only partly along the axial extent of the second gear 50 and are located midway/centered between the first and second axial ends, with axially and circumferentially extending flanges 84 axially outboard of the teeth 62. In at least some implementation, one of the flanges 84 axially overlaps the pinion shaft 32, and may overlap the axis 34 of the pinion shaft 32, if desired. In at least some implementations, at least part of the teeth 62 may axially overlap the pinion shaft 32, if desired, and an axially centerline of the second gear 50 may overlap the pinion shaft 32, if desired.

Therefore, in at least some implementations, the only retention of the pinion shaft 32 relative to the housing 12 is provided by the overlapping second gear 50. This can greatly reduce the cost and complexity to retain the pinion shaft 32, and to assemble the pinion shaft 32 into the differential 10, among other things. For example, when clips or fasteners are needed to retain the pinon shaft, the pinion shaft openings 36 are typically surrounded by a recess providing access to the ends of the pinion shaft 32 for installation of the clips or fasteners.

Further, if desired, a coating or insert can be applied to one or both of the ends of the pinion shaft 32 and the inner surface 58 of the second gear 50, at least where the inner surface 58 overlaps the pinion shaft 32. This coating may provide an interference fit between these components, damp vibrations or further limit movement of the pinion shaft 32 relative to the housing 12, and/or the coating may have a desired hardness or toughness and durability to reduce wear at the interface between the pinion shaft 32 and second gear 50. Such a coating or insert is optional, and at least some implementations do not include any such coating or insert.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A vehicle differential, comprising:
a housing;
an input gear mounted to the housing so that the housing and input gear rotate together;
a pinion shaft mounted in the housing;
a first pinion gear and a second pinion gear both mounted on the pinion shaft;
a first side gear within the housing and engaged with the first pinion gear and the second pinion gear;
a second side gear within the housing and engaged with the first pinion gear and the second pinion gear; and
a second gear mounted to the housing so that the second gear and the housing rotate together about an axis of rotation, wherein the housing includes a gear mounting surface and the second gear includes a radial inner surface received on the gear mounting surface, and part of the radial inner surface of the second gear overlaps at least part of the pinion shaft and limits movement of the pinion shaft relative to the housing.

2. The vehicle differential of claim 1 wherein the housing includes at least one pinion shaft opening through which the pinion shaft is received into the housing, and wherein the second gear overlaps at least part of the at least one pinion shaft opening.

3. The vehicle differential of claim 2 wherein the housing includes two pinion shaft openings and each end of the pinion shaft is received in a respective one of the pinion shaft openings and the second gear overlaps at least part of each end of the pinion shaft.

4. The vehicle differential of claim 1 wherein the gear mounting surface extends axially relative to the axis of rotation.

5. The vehicle differential of claim 1 wherein the input gear and the second gear are coaxial.

6. The vehicle differential of claim 1 wherein the second gear has an axis of rotation and the inner surface axially overlaps the pinion shaft by at least 0.5 mm.

7. The vehicle differential of claim 6 wherein the inner surface overlaps the pinion shaft by at least 10% of the diameter of the pinion shaft.

8. The vehicle differential of claim 1 wherein the second gear has a rotational axis and includes radially outwardly extending teeth, and wherein at least part of the teeth axially overlap the pinion shaft.

9. The vehicle differential of claim 1 wherein the housing includes two pinion shaft openings and each end of the pinion shaft is received in a respective one of the pinion shaft openings, and wherein the gear mounting surface has a center axis and the gear mounting surface has a lesser axial extent in the area of pinion shaft openings than in at least some areas circumferentially spaced from the pinion shaft openings.

10. The vehicle differential of claim 1 wherein the inner surface has a diameter that is larger by 3 mm or less than an axial length of the pinion shaft.

11. The vehicle differential of claim 1 wherein the pinion shaft is retained relative to the housing by the second gear without another retaining component connected to either the housing or the pinion shaft.

12. The vehicle differential of claim 1 wherein the input gear and the second gear are coaxial and the second gear is axially offset from the input gear.

13. The vehicle differential of claim 1 wherein the housing includes at least one window open to an interior of the housing and through which one or more gears are installed into the interior, and wherein the second gear overlaps part of the at least one window.

14. The vehicle differential of claim 1 wherein an axial length of the gear mounting surface varies along a circumferential length of the gear mounting surface.

15. The vehicle differential of claim 1 wherein the housing includes a stop surface that extends radially and is located at an axial end of the gear mounting surface.

16. The vehicle differential of claim 15 wherein the second gear is received against the stop surface.

17. A vehicle differential, comprising:
a housing;
an input gear mounted to the housing so that the housing and input gear rotate together;
a pinion shaft mounted in the housing;
a first pinion gear and a second pinion gear both mounted on the pinion shaft;
a first side gear within the housing and engaged with the first pinion gear and the second pinion gear;
a second side gear within the housing and engaged with the first pinion gear and the second pinion gear; and
a second gear mounted to the housing so that the second gear and the housing rotate together, wherein part of the second gear overlaps at least part of the pinion shaft and limits movement of the pinion shaft relative to the housing, and wherein the housing includes a gear mounting surface and the second gear includes an inner surface received over at least part of the gear mounting surface, and wherein the gear mounting surface extends circumferentially about an exterior of the housing and the gear mounting surface extends parallel to a rotational axis of the input gear.

18. A vehicle differential, comprising:
a housing;
an input gear mounted to the housing so that the housing and input gear rotate together;
a pinion shaft mounted in the housing;
a first pinion gear and a second pinion gear both mounted on the pinion shaft;
a first side gear within the housing and engaged with the first pinion gear and the second pinion gear;
a second side gear within the housing and engaged with the first pinion gear and the second pinion gear; and
a second gear mounted to the housing so that the second gear and the housing rotate together, wherein part of the second gear overlaps at least part of the pinion shaft and limits movement of the pinion shaft relative to the housing, wherein the second gear has a rotational axis and outwardly extending teeth, and wherein the teeth are axially centered on the second gear.

19. The vehicle differential of claim 18 wherein the second gear is symmetrical about the axis of the second gear.

* * * * *